(12) United States Patent
Walker

(10) Patent No.: US 7,775,349 B2
(45) Date of Patent: Aug. 17, 2010

(54) SHRINK-WRAP PACKAGING INCORPORATING REINFORCED INTEGRAL HANDLE

(75) Inventor: Terry D. Walker, Westminster, CO (US)

(73) Assignee: Millercoors LLC, Golden, CO (US)

( * ) Notice: Subject to any disclaimer, the term of this patent is extended or adjusted under 35 U.S.C. 154(b) by 181 days.

(21) Appl. No.: 11/462,927

(22) Filed: Aug. 7, 2006

(65) Prior Publication Data

US 2007/0215505 A1 Sep. 20, 2007

Related U.S. Application Data

(63) Continuation-in-part of application No. 11/384,064, filed on Mar. 17, 2006.

(51) Int. Cl.
*B65D 75/00* (2006.01)
*B65D 65/00* (2006.01)
*B65D 71/08* (2006.01)

(52) U.S. Cl. ............... 206/162; 206/432; 206/497; 206/428

(58) Field of Classification Search ........ 206/432, 206/497, 815, 428, 162, 150, 427, 139; 383/16, 383/17, 19–21
See application file for complete search history.

(56) References Cited

U.S. PATENT DOCUMENTS

| | | | |
|---|---|---|---|
| 2,468,695 A | | 4/1949 | Wallace et al. |
| 3,087,610 A | | 4/1963 | Kirkpatrick |
| 3,111,221 A | * | 11/1963 | Chapman et al. ............ 206/147 |
| 3,118,537 A | | 1/1964 | Copping |
| 3,217,874 A | * | 11/1965 | Potter ..................... 206/432 |
| 3,338,404 A | | 8/1967 | Becker et al. |
| 3,347,365 A | | 10/1967 | Funkhouser |
| 3,387,702 A | | 6/1968 | Reynolds et al. |
| 3,388,788 A | | 6/1968 | Hellem |
| 3,403,779 A | | 10/1968 | Becker et al. |
| 3,411,619 A | | 11/1968 | Tokuji Saito et al. |

(Continued)

OTHER PUBLICATIONS

Applicant's Admitted Prior Art: TW Hi-Cone Global BPM Solutions website: www.hi-cone.com/Pkg-Solutions/sidelift_can.htm, entitled "Multi-pack Solutions for Side-Lift Can Carriers", "Multi-pack Solutions for Top-Lift Can Carriers", "Rim Applied Can Carries With C . . . ", and "Side-Lift Bottle Carries", printed Sep. 8, 2006, 4 pages.

*Primary Examiner*—Mickey Yu
*Assistant Examiner*—Melissa L Lalli
(74) *Attorney, Agent, or Firm*—Sheridan Ross PC

(57) ABSTRACT

Shrink-wrap packaging is provided with at least one reinforced integral handle. Each handle is formed by an opening formed in the shrink-wrap material, and a reinforced area that surrounds the opening. Preferably two handles are located at opposite ends or sides of the package. The reinforced areas include an additional layer of the shrink-wrap film, or may include other material such as other types of thermoplastics, paper/fiber composites, or combinations thereof. Shading may be applied to the reinforced areas in order that a consumer can more easily recognize the openings in the shrink-wrap as designated handles. Other embodiments include handles formed by use of a paperbound element in combination with openings in the shrink-wrap material, and webbing secured to a plurality of the containers along with a handle loop integral with the webbing that is orientated to extend through the opening in the shrink wrap material.

14 Claims, 7 Drawing Sheets

U.S. PATENT DOCUMENTS

| | | |
|---|---|---|
| 3,425,544 A | 2/1969 | Ayer et al. |
| 3,447,675 A | 6/1969 | Kirby |
| 3,462,009 A * | 8/1969 | Moore .................. 206/145 |
| 3,477,564 A * | 11/1969 | Crabtree ................ 206/432 |
| 3,595,384 A | 7/1971 | Sargent et al. |
| 3,664,498 A * | 5/1972 | Dulmage ............... 206/432 |
| 3,674,135 A * | 7/1972 | Simon .................. 206/225 |
| 3,675,767 A | 7/1972 | Taylor |
| 3,747,749 A * | 7/1973 | Brown .................. 206/432 |
| 3,788,463 A | 1/1974 | Ruff |
| 3,804,235 A | 4/1974 | Anderson |
| 3,837,478 A | 9/1974 | Cunningham |
| 4,125,220 A | 11/1978 | Suominen |
| 4,130,201 A | 12/1978 | Duerr |
| 4,166,532 A | 9/1979 | Tsuchida et al. |
| 4,289,236 A | 9/1981 | Ganz et al. |
| 4,295,598 A | 10/1981 | Calvert |
| 4,333,570 A * | 6/1982 | Heider .................. 206/432 |
| 4,475,653 A | 10/1984 | Ullman |
| 4,535,587 A | 8/1985 | Rias |
| 4,700,528 A | 10/1987 | Bernard |
| 4,796,754 A | 1/1989 | Chaussadas et al. |
| 4,932,528 A * | 6/1990 | Benno .................. 206/432 |
| 4,989,993 A * | 2/1991 | Barnard ................... 383/6 |
| 5,038,928 A * | 8/1991 | Marco et al. ............ 206/162 |
| 5,154,289 A * | 10/1992 | Van Erden ............. 206/432 |
| 5,168,989 A | 12/1992 | Benno |
| 5,570,787 A | 11/1996 | Danovaro et al. |
| D404,203 S | 1/1999 | Maier-Aichen |
| 6,880,313 B1 | 4/2005 | Gessford et al. |
| 2003/0101685 A1 | 6/2003 | Jansen et al. |
| 2005/0157956 A1 | 7/2005 | Geyer |
| 2006/0233466 A1 | 10/2006 | Mantzivis |
| 2007/0215504 A1 | 9/2007 | Walker |

* cited by examiner

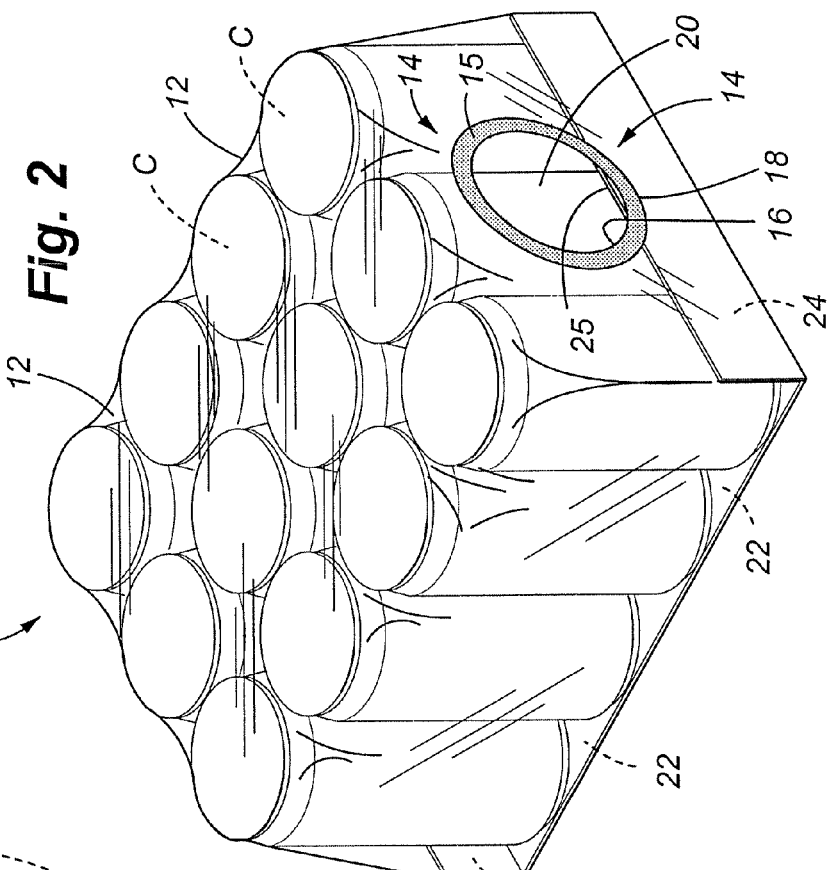
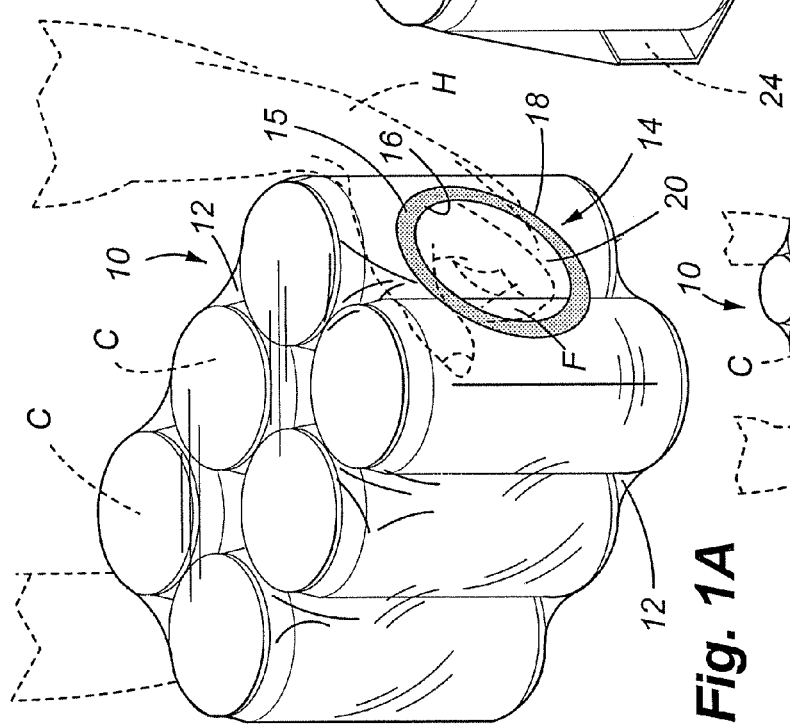
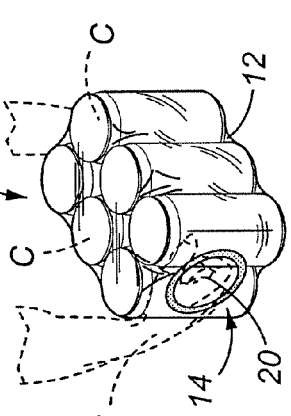

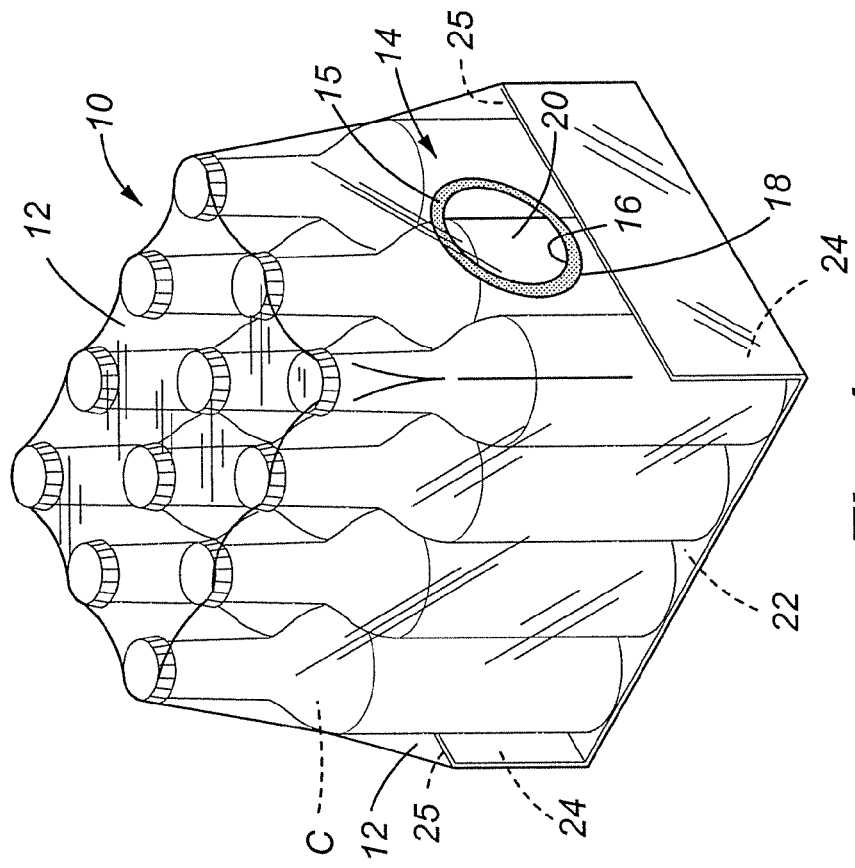
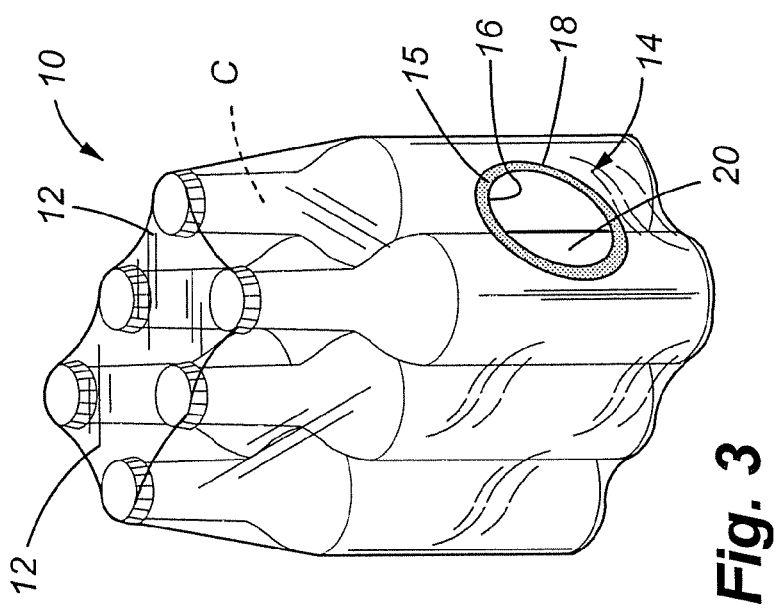

SHRINK-WRAP PACKAGING INCORPORATING REINFORCED INTEGRAL HANDLE

CROSS REFERENCE TO RELATED APPLICATIONS

This application is a continuation-in-part and claims the benefit of U.S. patent application Ser. No. 11/384,064, filed Mar. 17, 2006, the entire disclosure of which is hereby incorporated herein by reference.

FIELD OF THE INVENTION

The present invention relates to packaging used to package consumer goods, and more particularly, to shrink-wrap packaging incorporating a reinforced integral handle.

BACKGROUND OF THE INVENTION

For beverage containers, one traditional method of packaging includes the use of paperboard or cardboard packages. For beverage cans, it is common to find 12 or 24-pack arrangements of the containers packaged in a paperboard or cardboard container. For bottles, the most typical arrangement is a 6-pack container made of a paperboard material.

More recently, shrink-wrap packaging has been used to package many types of beverage containers, such as 12 or 24-pack arrangements of beverage cans and plastic beverage containers. For example, it is well known to provide shrink-wrap packaging for 24-pack arrangements of bottled water and soft drinks.

In a packaging operation, the group of containers to be packaged are wrapped with shrink-wrap material and then the group of containers pass through a heat tunnel or heat station causing the shrink-wrap film to shrink around and tightly hold the group of containers together. Prior to heat treatment, the shrink-wrap film is dispensed from a roll of shrink-wrap material that is sized to cover the particular group of containers. Typically, the opposite sides or ends of the package each have an opening where the shrink-wrap material does not completely enclose the containers.

Shrink-wrap packaging has many advantages over traditional paperboard/cardboard packaging. Shrink-wrap film is typically made from polyethylene. Polyethylene is a durable material that costs considerably less than paperboard/cardboard. Polyethylene readily accepts printing or other forms of coloration or shading that is desired to be placed on the packaging. However, one disadvantage of shrink-wrap material is that there is no inherent feature in the material itself that lends itself for providing a handle or grasping means. It is known that consumers will often attempt to carry a shrink-wrapped package by grasping the openings formed by the shrink-wrap material that does not completely enclose the opposite ends of the package. Because of the irregular shape of these openings, as well as the non-reinforced nature of the shrink-wrap material surrounding the openings, grasping the shrink-wrap material through the openings can cause the material to tear, thus destroying the package and causing the containers to separate from the package.

Therefore, there is a need for an integral handle or grasping structure that allows the shrink-wrap package to be easily carried by the consumer, without the concern of breaking the package open by tears caused by the weight of the package concentrated at the point where the package is grasped.

SUMMARY OF THE INVENTION

In accordance with the present invention, shrink-wrap packaging is provided that incorporates a reinforced integral handle. The handle is formed by providing a reinforced area around the opening in the shrink-wrap material where the material does not completely cover the containers, typically located on opposite sides or ends of the package.

The reinforced area is provided in accordance with various embodiments of the present invention. In one embodiment, the reinforced area is provided by an additional layer of the shrink-wrap film. This additional layer of material may be provided by folding the lateral edges of the sheet of shrink-wrap material to form strips of doubly reinforced material. The folded edges may be secured to the sheet of shrink-wrap material in any number of ways to include adhesive or heat-treating the shrink-wrap material at that location so the layers adhere to one another. In another embodiment of the invention, the reinforced areas may be formed by applying separate second layers of material to each lateral edge of the sheet of shrink-wrap film. These second layers of material may include precut strips of shrink-wrap film or other materials such as various types of paper/fiber composites, or other types of thermoplastic material.

It is preferable that heat treating of the shrink-wrap material, results in creation of openings at opposite ends of the package that are uniform in size, and that are symmetrical. Also, it is preferable that these openings are substantially round or oval, and centered on ends of the package so that a consumer can insert their fingers through one or both openings to effectively grasp and carry the package at many different angles.

Optionally, desired shading may be applied to the reinforced area in order that a consumer can more easily recognize the openings in the shrink-wrap as designated handles. The term "shading" as used herein shall be understood to encompass any method by which the reinforced area surrounding an opening is distinguished from the remaining shrink-wrap material. The shading may include ink or other coloring agents that may be applied to the reinforced area prior to heat treatment of the shrink-wrap material, or shading applied after heat treatment. One preferred way in which to apply the shading is by printing the reinforced areas with ink prior to heat treatment.

The integral handle of the present invention may be used with any number of different types of packaging arrangements. For example, the handle may be provided on 6, 12, or 24-pack container arrangements. Additionally, the handle may be incorporated in packaging that includes only shrink-wrap material, or packaging that also incorporates a cardboard/paperboard element, such as a paperboard tray or u-board that supports the bottoms of the containers.

Although a single layer of reinforcement is contemplated for the reinforced areas, it shall also be understood that the handle of the present invention may include additional layers as necessary to provide proper reinforcement for ensuring that the shrink-wrap material does not inadvertently tear or break when the consumer grasps the handle. The size of the reinforced areas as well as the size of the openings in the shrink-wrap material may be adjusted to best accommodate grasping by the consumer.

Although it is preferable to provide two handles at opposite ends of the package, the present invention also contemplates one or more than two handles located at various positions on the package.

In yet another embodiment of the present invention, the integral handle is created by use of a paperboard element that is preferably placed on the top edges of the containers, and the paperboard element has at least one opening formed therein. The shrink-wrap material covers the paperboard element. A perforation or slit is formed in the shrink-wrap material at the location of the opening in the paperboard element. The consumer places the fingers through the shrink-wrap material and through the opening in the paperboard element in order to carry the container.

In yet another embodiment of the present invention, the integral handle is created by use of plastic webbing that is secured to some of the containers, and a handle loop that is integral with the plastic webbing and extends through the opening in the shrink-wrap material located on the opposite sides or ends of the package. This handle may be used in conjunction with the reinforced area incorporated on the openings in the shrink-wrap material, or the handle loop can be the only integral handle that simply extends through a non-reinforced opening in the shrink-wrap material. The size of the handle loop can be adjusted with respect to the size of the opening in the shrink-wrap material. The handle loop must be large enough to accommodate grasping by the hand.

Other features and advantages of the present invention will become apparent from a review of the following detailed description, taken in conjunction with the corresponding drawings.

BRIEF DESCRIPTION OF THE DRAWINGS

FIG. 1A is a perspective view illustrating an embodiment of the present invention incorporated in a 6-pack can package;

FIG. 1B illustrates the embodiment of FIG. 1A in a reverse perspective view;

FIG. 2 illustrates an embodiment of the present invention incorporated in a 12-pack can package, and wherein a paperboard/cardboard element is used for additional support;

FIG. 3 shows a 6-pack bottle package incorporating the handle of the present invention;

FIG. 4 illustrates a 12-pack bottle package with a paperboard/cardboard element incorporating the handle;

DETAILED DESCRIPTION OF THE INVENTION

Figure 6:
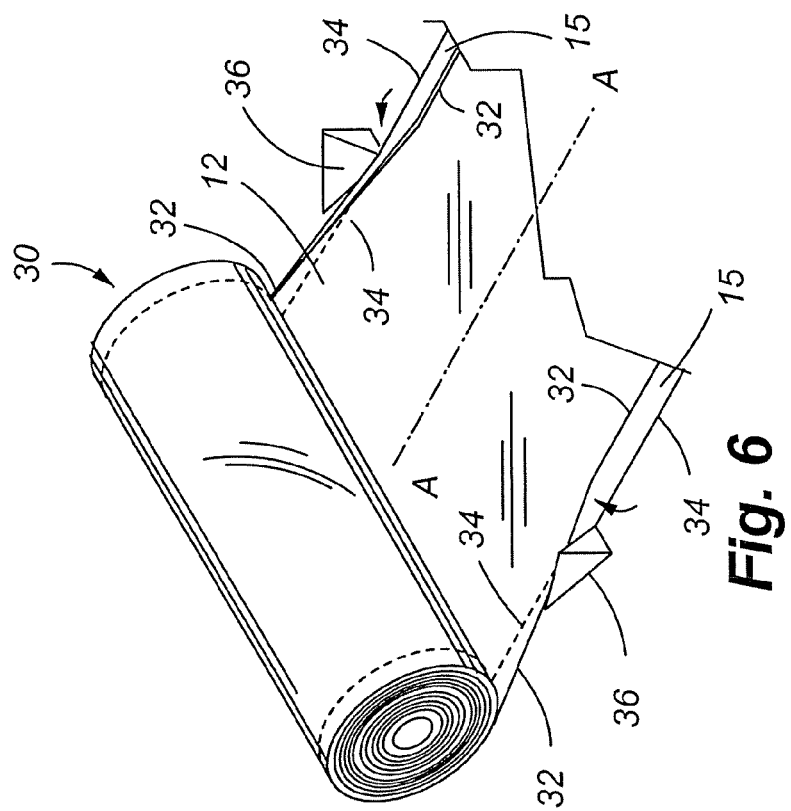
FIG. 6 is another perspective view of the sheet of material showing the lateral edges being folded over thus creating the reinforced areas in accordance with one preferred embodiment.

FIGS. 1A and 1B illustrate a shrink-wrap packaging arrangement incorporating the reinforced integral handle of the present invention in a first embodiment. More specifically, these Figures illustrate a 6-pack arrangement of containers C, wherein the package 10 covers the containers, except for openings 20 formed at opposite ends of the package. As shown, the package 10 exposes only the sidewalls of the containers, but the top and bottom ends of the containers are covered. Preferably, each of the opposite ends of the package includes a handle 14 including respective reinforced areas 15 having inner peripheral edges 16 and outer peripheral edges 18. Also, the reinforced areas 15 are preferably substantially round or oval in shape, and have a substantially uniform width. The openings 20 are sized so that the fingers F of the hands H may be inserted therethrough for grasping the package. As also shown, the handles 14 have shading which distinguishes them from the remaining shrink-wrap material 12 which encloses the container C.

FIG. 2 illustrates another embodiment of the present invention wherein the package 10 is used to package a 12-pack arrangement of containers. In this embodiment, a u-board support 22 is provided which provides support to the bottom edges of the containers. The u-board includes a pair of side extensions 24 that extend upwards from the support a desired distance along opposite sides of the package. As with the first embodiment, the second embodiment also incorporates the handles 14 including openings 20 that are sized to receive the fingers of the hand. Depending upon the additional support required as provided by the u-board support 22, the most upper edge 25 of the side extensions 24 may intersect with the openings 20, or may only extend to a position below the openings 20. In both embodiments, the locations of the openings 20 are shown as being substantially centered on the opposite ends of the packaging. However, it shall be understood that the openings 20 may be modified in size and shape, and may be positioned at other locations on the package in order to best accommodate grasping based on the particular group of containers that are packaged. Furthermore, the thickness and construction of the reinforced area 15 may also be modified to accommodate the particular packaging arrangement. For packages including a greater number of containers, it may be necessary to provide extra reinforcement for the reinforced areas 15 by increasing the thickness of the reinforced areas, and/or by providing additional layers of material.

FIG. 3 illustrates another embodiment of the present invention that can be used with a 6-pack bottle arrangement. As illustrated, the handles 14 in this embodiment are also preferably centered on the ends of the package, and positioned so that the fingers of the hands may be conveniently placed through the openings 20.

FIG. 4 illustrates yet another preferred embodiment of the present invention used with a 12-pack bottle arrangement. As with the previous embodiments, the handles 14 are preferably centered on the ends of the package, and while two handles placed at opposite ends of the package are shown, only one handle is required. As also shown in FIG. 4, the most upper edges 25 of the side extensions 24 in this embodiment do not intersect the openings 20.

Figure 5:
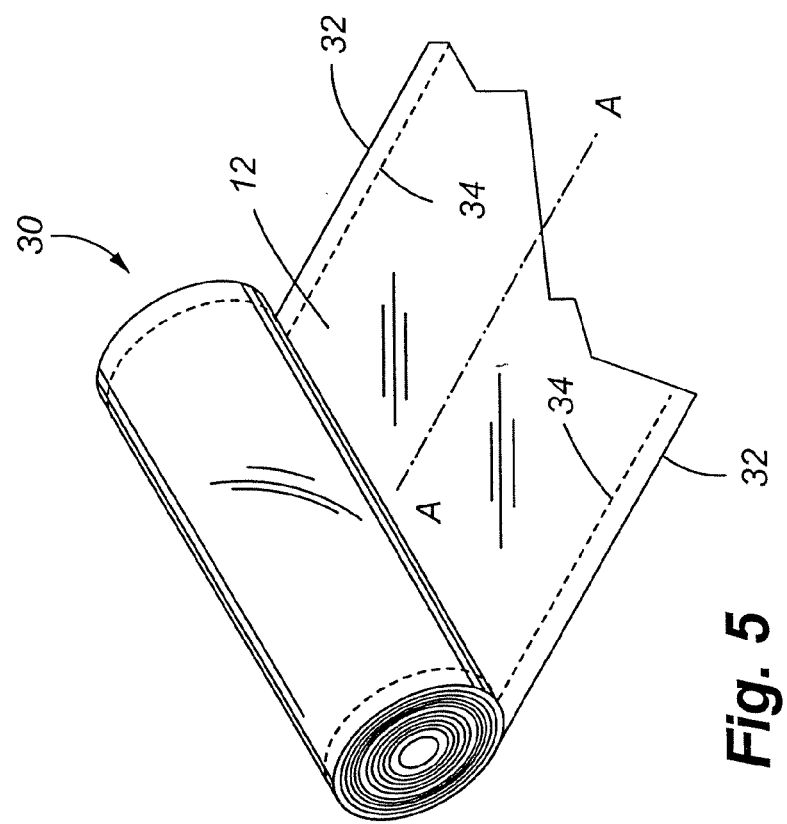
FIG. 5 is a perspective view of a sheet of shrink-wrap material used in a packaging operation.

Referring to FIG. 5, a roll of shrink-wrap material 30 is illustrated, the roll having opposite lateral edges 32, and respective designated fold or tear lines 34. Lines 34 simply represent areas on the shrink-wrap material 12 where the material will be manipulated to form the respective reinforced areas 15 of the handles 14.

Referring to FIG. 6, in a packaging operation, elements 36 generally represent a folding or a cutting and folding station wherein the lateral edges 32 are rotated inwards towards the central axis A-A of the sheet of material, and the resulting doubly reinforced areas represent the reinforced areas 15 that are incorporated in the handles 14. Depending upon the type of shrink-wrap material used, it may be advantageous to perforate or pre-fold the shrink-wrap material along the designated fold lines 34 in order to better facilitate creation of the reinforced areas.

It is also contemplated that the reinforced areas 15 of the handles 14 can be provided by applying separate strips of material on the lateral edges of the sheet of shrink-wrap material, and then attaching the separate strips as by adhesive, or by applying heat to the lateral edges thereby causing the shrink-wrap material to adhere to the strips of added material. The strips of material may comprise one or more than one layer of material depending upon the amount of reinforcement required in the package. Additionally, the strips of material may comprise shrink-wrap material, other thermoplastic material, paperboard or other paper products, or combinations thereof.

Figure 7:
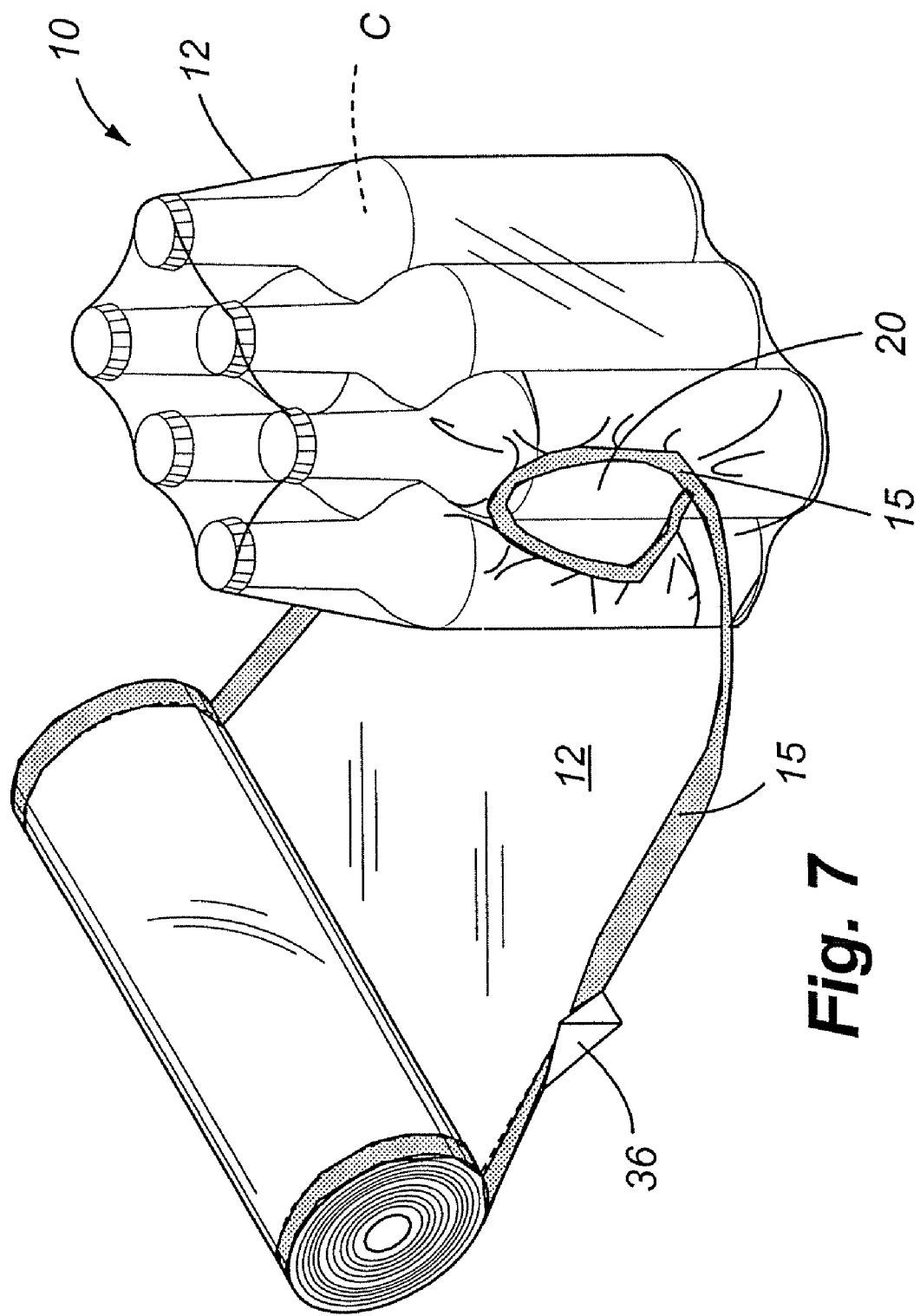
FIG. 7 illustrates one step in a packaging operation wherein the shrink-wrap material is wrapped around the package.

FIG. 7 generally illustrates another step in a packaging operation wherein the shrink-wrap material 12 has been wrapped around the group of containers C, yet the shrink-wrap material has not yet passed through a heat tunnel to form the final package including the preferably symmetrical, round/oval, and uniform handles formed at opposite sides of the package. In the packaging operation, it may be necessary to manipulate the shrink-wrap material at the ends where the handles are formed in order to ensure that the handles are correctly positioned and sized. For example, it may be necessary to perform one or more additional folding or heat-treating steps on the shrink-wrap material at the ends of the package in order to best preposition the reinforced areas prior to heat treatment in the heat tunnels. Accordingly, the reinforced areas 15 shown in FIG. 7 are not yet formed in their final shapes.

Figure 8:
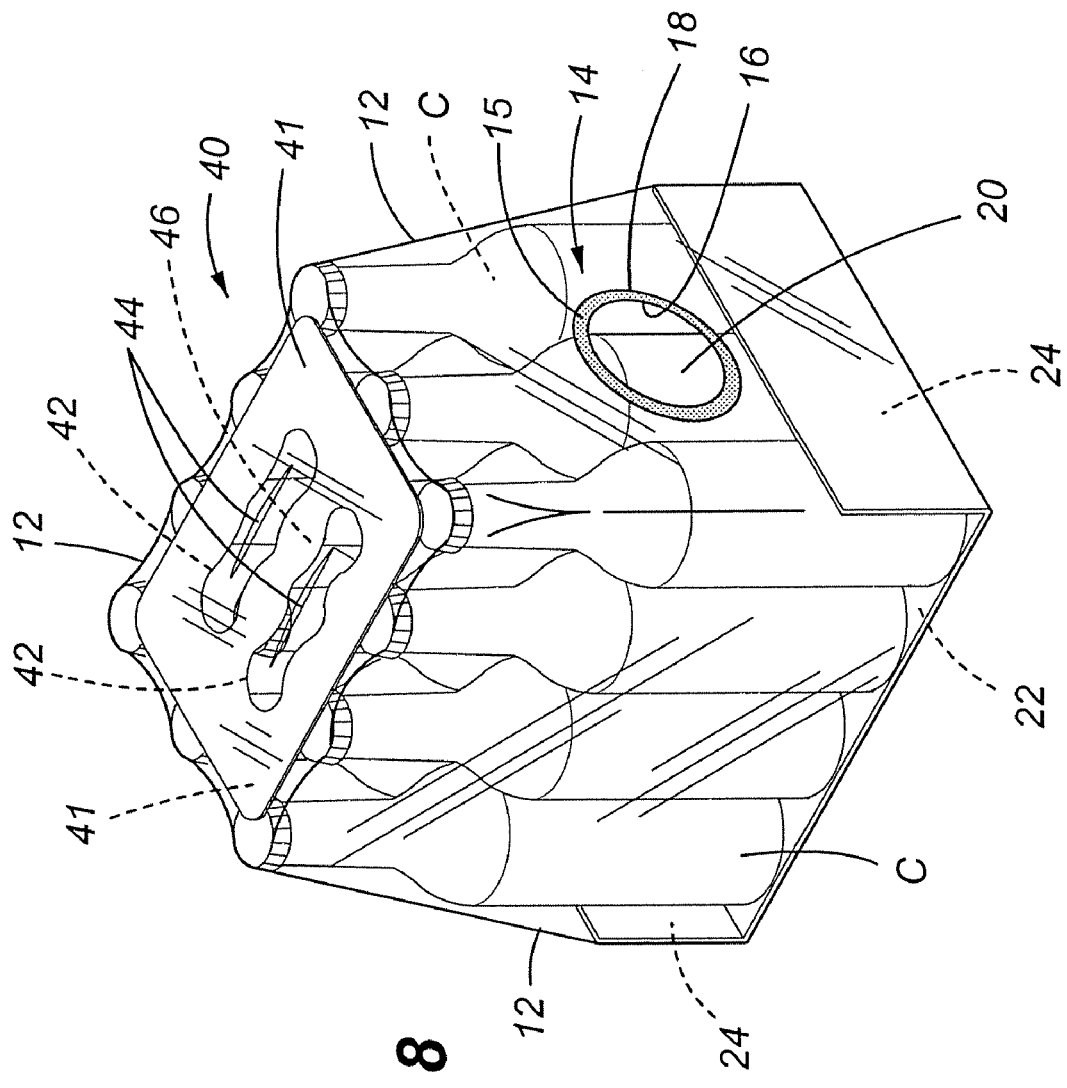
FIG. 8 illustrates another embodiment of the present invention incorporating a cardboard/paperboard element with the handle.

FIG. 8 illustrates yet another embodiment in the present invention wherein an additional handle 40 is formed on the upper edges of the containers. This additional handle 40 includes a fiberboard or paperboard element 41 that is placed on the upper surfaces of the container C. This element 41 extends across a majority of the length and width of the upper surfaces of the containers, but preferably does not extend beyond the upper peripheral edge of the package as defined by the exposed outside upper edges of the containers. A pair of openings 42 is formed in the element 41, and the openings are sized to receive the fingers of the hand. A pair of corresponding slits or perforations 44 is formed in the shrink-wrap material 12 over the openings 42. In use, the user places the fingers of the hand downward through one of the openings 42, and wraps the fingers around the central support 46 of the element 41 in order to carry the container. In a packaging operation, the element 41 is first placed upon the upper surfaces of the container prior to wrapping the shrink-wrap material.

FIG. 8 also illustrates the handles 14 formed on opposite ends of the package. It shall be understood that with respect to the embodiment of FIG. 8, the present invention contemplates either use of only the handle 40, or use of the handle 40 in combination with at least one handle 14. Also, it should be understood that the handle 40 could be incorporated within any of the other packaging arrangements shown in the other embodiments of the invention.

Figure 9:
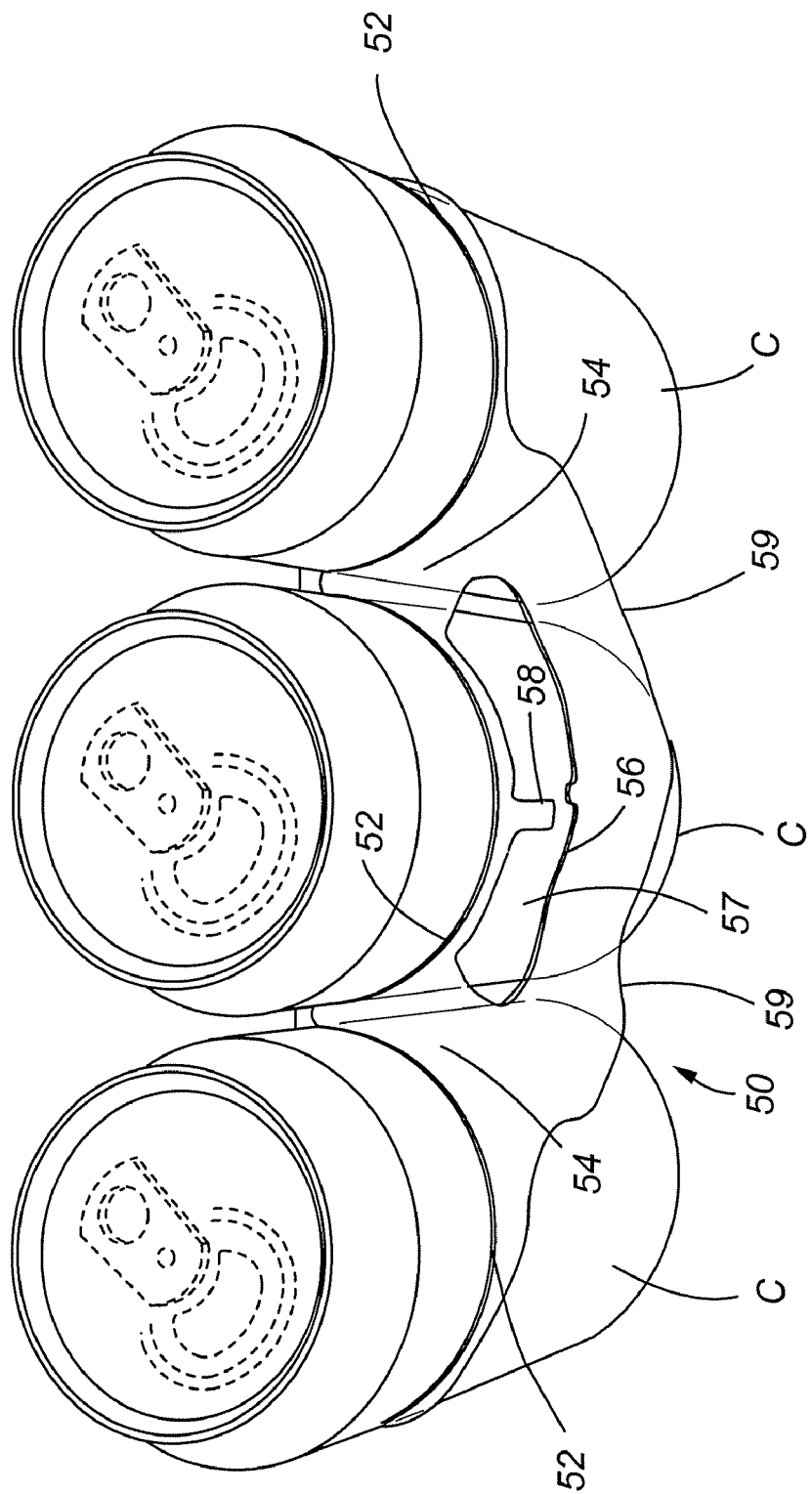
FIG. 9 illustrates yet another embodiment of the present invention including plastic webbing that interconnects a plurality of the containers, and a handle loop that extends away from the plastic webbing.

FIG. 9 illustrates yet another embodiment of the present invention. FIG. 9 illustrates three containers C that are connected to one another by plastic webbing 50. As shown, the webbing comprises three container rings 52 that encircle the containers, and a connecting portion 54 that interconnects the three containers to one another. The plastic webbing 50 may be the same type of material that is commonly used in a six-pack can arrangement to secure a six-pack. A handle loop 56 protrudes from the center container, the handle loop 56 being made of the same material as the container rings and connecting portions. An opening 57 details the area where the user may insert the hand to grasp the handle loop 56.

Figure 10:
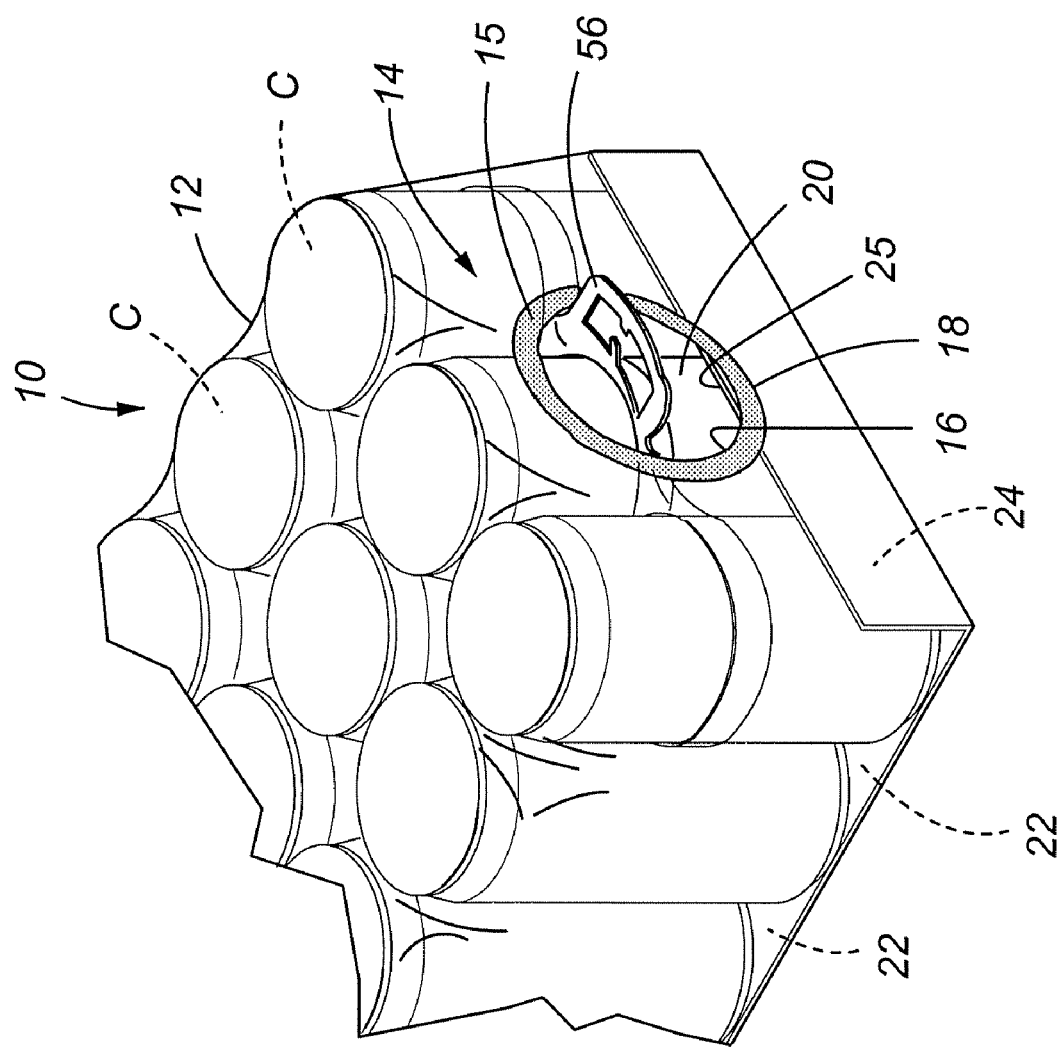
FIG. 10 is a perspective view of the embodiment of FIG. 9 incorporated in a twelve-pack can package, the handle loop being used in conjunction with the handle of the embodiment of FIG. 2.

Referring to FIG. 10, the handle loop 56 forms another handle that can be used in conjunction with the handle 14. As shown, the handle loop 56 extends through the opening 20. A retention tab 58 may be integrally formed on the webbing 50 in order to prevent the handle loop from excessively protruding through the opening 20. During shipment and storage, it is undesirable for the handle loop to protrude since the loop could get caught in a foreign object. Thus, prior to use, the user would break the tab as shown allowing the handle to fully protrude as shown in FIG. 10. In FIG. 9, the tab 58 is shown as extending across opening 57. However, it is also contemplated that the tab 58 may be secured to the outer edge 59 thereby further drawing the handle loop 56 closer to the containers and preventing the handle loop from protruding into the opening 20. When a user grasps the handle loop 56, the package 10 may be lifted, and the weight of the containers are primarily distributed among the three connected containers by the plastic webbing 50. This distributed weight against the shrink-wrap located at the end of the package helps to ensures that the shrink-wrap does not inadvertently rip or tear.

The handle loop 56 may be sized to contact the reinforced area 15 thus also resulting in transfer of some of the weight of the package against the reinforced area 15. Alternatively, the handle loop 56 can be sized such that it does not make contact with the reinforced area 15.

In the example of FIG. 10, a consumer is provided two options for handling the package, either by grasping the handle loop 56, or by carrying the package by placing the fingers of the hand through the opening 20. It is also contemplated with respect to embodiment in FIGS. 9 and 10 that the handle loop 56 can be incorporated without a reinforced area 15, thus a single layer of shrink-wrap material can be used. It is also contemplated that with respect to the embodiment of FIGS. 9 and 10 that during the shrink-wrap operation, the shrink-wrap material could come in contact with the handle loop 56 thus resulting in the shrink-wrap material being bonded to the handle loop 56. In this instance, the opening 20 would not be round shaped, and rather would be more of an irregular shape to account for the overlapping shrink-wrap material that adhered to a portion the handle loop 56.

Although three containers are illustrated as being connected by the plastic webbing 50, it is also contemplated that additional containers may be connected by the webbing in order to further distribute the load of the package when carried by the handle loop 56. Depending upon the size and weight of the package, the plastic webbing can be used to provide a secure base for the handle loop 56.

In accordance with the method of the present invention, the method comprises providing a layer of film material, creating a reinforced area on at least one lateral edge of the film material, wrapping containers with the film material, and applying heat to the film material in order to shrink the film material around the containers, wherein a handle is formed by the reinforced area. Preferably, the reinforced area has a continuous arcuate shape, such as a circle or oval shape. The method also contemplates various ways in which to create reinforced area, one method being folding lateral edges of the film material, while another method contemplates applying respective separate pieces of material to the lateral edges of the film material. Additionally, the method contemplates applying appropriate shading to the film material in order to distinguish the handle area from other areas on the packaging.

There are many advantages to the shrink-wrap packaging incorporating the reinforced integral handle of the present invention. Shrink-wrap packaging provides an economical, yet reliable means for packaging containers. The integral handle provides a user with a convenient way to carry the package and without destroying the continuity of the package prior to opening the package. The integral handle may be placed at any convenient location along the package, and the size and construction of the handle may be easily modified to best accommodate the type of package being used.

Various embodiments of the present invention may be provided including an integral handle made only with shrink-wrap material, an integral handle formed only with plastic webbing, or any combinations thereof.

While the present invention has been set forth above with respect to preferred embodiments in both an apparatus and method, it shall be understood that other changes and modifications can be made within the spirit and scope of the invention commensurate with the scope of the claims appended hereto.

What is claimed is:

1. A package comprising:
a film layer surrounding a plurality of containers therein, said film layer being heat treated to shrink said film layer around said containers;
an opening formed in said film layer said opening exposing portions of a sidewall of at least one container and said film layer covering remaining portions of said sidewall of said container including substantially all of upper and lower portions of said sidewall;
a reinforced area formed by a second layer of material substantially surrounding said opening; and
webbing secured to a plurality of the containers, and a handle loop extending from the webbing and through the opening.

2. The package, as claimed in claim 1, wherein:
said reinforced area has a shading that is different from a shading of said film layer surrounding the containers.

3. A package, as claimed in claim 1, wherein:
said opening is substantially round shaped.

4. A package, as claimed in claim 1, wherein:
said reinforced area has a substantially uniform width and is substantially ring shaped.

5. A package, as claimed in claim 1, wherein:
said reinforced area is formed by folding an edge of said film layer and securing the folded edge to said film layer.

6. A package, as claimed in claim 1, wherein:
said reinforced area is formed by applying said second layer of material on an edge of said film layer.

7. A package, as claimed in claim 6, wherein:
said second layer of material comprises a film material.

8. A package, as claimed in claim 6, wherein:
said second layer of material is a separate piece of material.

9. A package, as claimed in claim 6, wherein:
said second layer of material is a different material than said film layer.

10. A package, as claimed in claim 1, wherein:
said film layer comprises polyethylene film.

11. A package, as claimed in claim 2, wherein:
said shading is formed by printing a shading on said reinforced area.

12. A package, as claimed in claim 1, wherein:
said webbing includes a plurality of container rings that secure a corresponding plurality of containers.

13. A package, as claimed in claim 1, wherein:
said handle loop contacts the reinforced area.

14. A package, as claimed in claim 1, wherein:
said handle loop is spaced from said reinforced area and not in contact with said reinforced area.

\* \* \* \* \*